United States Patent [19]

Hua

[11] Patent Number: 5,777,439
[45] Date of Patent: Jul. 7, 1998

[54] DETECTION AND PROTECTION CIRCUIT FOR FLUORESCENT LAMPS OPERATING AT FAILURE MODE

[75] Inventor: Jenkin P. Hua, Plainsboro, N.J.

[73] Assignee: Osram Sylvania Inc., Danvers, Mass.

[21] Appl. No.: 614,773

[22] Filed: Mar. 7, 1996

[51] Int. Cl.⁶ .................................................. H05B 37/02
[52] U.S. Cl. .................... 315/225; 315/121; 315/DIG. 5; 315/324
[58] Field of Search ............................... 315/225, 324, 315/119, 121, DIG. 5

[56] References Cited

U.S. PATENT DOCUMENTS

| | | | |
|---|---|---|---|
| 4,177,403 | 12/1979 | Remery | 315/101 |
| 4,398,126 | 8/1983 | Zuchtriegel | 315/127 |
| 4,810,936 | 3/1989 | Nuckolls et al. | 315/119 |
| 4,928,039 | 5/1990 | Nilssen | 315/209 R |
| 4,970,438 | 11/1990 | Nilssen | 315/DIG. 5 |
| 5,051,661 | 9/1991 | Lee | 315/225 |
| 5,089,753 | 2/1992 | Mattas | 315/225 |
| 5,111,114 | 5/1992 | Wang | 315/225 |
| 5,321,337 | 6/1994 | Hsu | 315/219 |
| 5,363,017 | 11/1994 | Garbowicz | 315/122 |

Primary Examiner—Robert Pascal
Assistant Examiner—Michael Shingleton
Attorney, Agent, or Firm—Carlo S. Bessone

[57] ABSTRACT

A circuit for protecting fluorescent lamps connected to a high frequency electronic ballast has a detecting bridge connected to the fluorescent lamps, an output of the detecting bridge varying linearly with a difference between a highest and a lowest voltage across the fluorescent lamps. A timer is connected to the detecting bridge output, and a trigger is connected to an output of the timer, the trigger being responsive to an over-voltage condition of a fluorescent lamp operating at failure mode. A controllable switch is connected across the fluorescent lamps, the controllable switch being controlled by an output of the trigger. The controllable switch, when closed, shorts the fluorescent lamps between their terminals, to protect the circuit when one or more fluorescent lamps are operating at failure mode or at the end of their operating life. A controller may be connected to a voltage-divided output of the detecting bridge, the output of the controller being fed back, and connected to, the high frequency electronic ballast. The ballast may then be shut down, or the output of the controller may be connected to a dimming circuit to dim the fluorescent lamps.

19 Claims, 5 Drawing Sheets

DETECTION AND PROTECTION CIRCUIT FOR FLUORESCENT LAMPS OPERATING AT FAILURE MODE

CROSS-REFERENCE TO A RELATED APPLICATION

This application discloses, but does not claim, inventions which are claimed in U.S. Pat. No. 5,606,224 issued Feb. 25, 1997 and assigned to the Assignee of this application.

FIELD OF THE INVENTION

The present invention relates to the field of fluorescent lamps, and more particularly to the detection of high voltages indicative of a fluorescent lamp operating at failure mode, and to the protection of fluorescent lamp circuits utilizing high frequency ballasts.

BACKGROUND OF THE INVENTION

When a fluorescent lamp is operating at failure mode or reaches the end of its operating life, the power of the lamp ballast may increase to abnormally high levels. In some cases, the lamp becomes so hot as to cause the glass wall of the lamp to crack. It is thus necessary to detect the condition wherein one or more lamps are operating at failure mode, and to employ a protection circuit to protect the circuit from overvoltages that may appear under these operating conditions.

It is presently known to protect arrays of parallel-connected fluorescent lamps by circuits which sense an over-voltage condition and interrupt the fluorescent lamps' power supply upon sensing an overvoltage condition that could damage or destroy the lamps.

An example of such a circuit is described in U.S. Pat. No. 4,398,126, in which a thyristor control circuit controls the firing of a thyristor to ground the base electrode of a transistor when an over-voltage condition is sensed. The transistor, when its base is grounded, de-energizes an oscillatory circuit which powers the fluorescent lamps, thus turning them off. This patent also describes a timer circuit which inhibits the firing of the thyristor during the igniting phase of the lamps.

Another similar example can be found in U.S. Pat. No. 5,321,337, in which a base electrode of a transistor which controls the oscillation of the circuit is grounded by a thyristor upon detection of excess voltage. In this circuit, a capacitor is charged by a coupling winding of a protection circuit, which, in turn, triggers a diac that activates the thyristor controlling the base of the transistor. Once the oscillation transistor is in its non-conductive state, it is prevented from oscillating and from supplying excessive voltage to the fluorescent lamps.

A further example of this approach is seen in U.S. Pat. No. 4,928,039, in which a sensing varistor limits over-voltages by charging a capacitor to a negative voltage, which removes base current from a transistor. This stops the oscillation of the transistor, and prevents the fluorescent lamps from being damaged by the over-voltage.

A still further example of this approach is described in U.S. Pat. No. 5,051,661, in which a heat sensing element triggers a thyristor in response to an abnormal voltage or in response to an overheated condition. The heat sensitive element is, in this example a bimetal switch. In the circuit described in this patent, the heat sensitive element triggers the thyristor to render a transistor conductive which, in turn, shorts out the primary winding of a transformer whose secondary windings are coupled to the bases of oscillation transistors. When the oscillation transistors are turned off, the fluorescent lamps are held in an off state.

Another example can be found in U.S. Pat. No. 5,111,114. In this reference, the generation of high amplitude, high frequency voltages which can damage the fluorescent lamps is prevented by turning the oscillation transistors off. This is accomplished by discharging a diac-driving capacitor which triggers one of the oscillating transistors. Once this capacitor is discharged, it is no longer capable of driving the transistor, and prevents the generation of harmful over-voltages and the supply of these over-voltages to the fluorescent lamps.

It is also known to apply a short circuit across a pair of malfunctioning lamps, to thereby prevent their operation. An example of this approach is described in U.S. Pat. No. 4,970,438, in which a varistor causes a capacitor to charge. When the voltage across the capacitor is high enough, it causes the breakdown of a diac which triggers a thyristor. When the thyristor is triggered, an effective short circuit is placed across the varistor and also across the malfunctioning pair of lamps. This prevents excessive power drain from the inverter and damage to the varistor. In this case, a separate protection circuit must be employed for each pair of fluorescent lamps.

As an alternative to shorting out malfunctioning fluorescent lamps, it is also known to open a switch connecting the fluorescent lamps to their power supply upon detection of an over- voltage using a diode-thyristor combination. This is shown in, for example, U.S. Pat. No. 4,810,936.

Also of interest is U.S. Pat. No. 5,363,017, in which starting capacitors, which shunt the fluorescent lamps upon start-up, are removed from the ballast upon ignition of all fluorescent lamps.

It is also known, as described in U.S. Pat. No. 4,177,403, to limit the igniting current to a low value when the fluorescent lamps fail to ignite. By coupling a temperature sensitive element to an inductor in series with the lamp ballast, the ballast current can be limited, so as to prevent damage to the lamps.

The above-described circuits, however, are complicated, prone to excessive failure, and are costly to implement. Indeed, adding additional fluorescent lamps to the circuits described above is a non-trivial task, and necessitates the addition of separate protection circuits for each fluorescent lamp, or each pair of fluorescent lamps.

There exists, therefore, a need for detection and protection circuits, for use with a plurality of fluorescent lamps, which are less complicated, more reliable, and less costly than those conventionally available. Moreover, there exists a need for detection and protection circuits for fluorescent lamps which are easily scaleable, whereby additional fluorescent lamps may be added to the detection and protection circuit at minimal cost using only a few added components.

SUMMARY OF THE INVENTION

Thus, it is an object of the present invention to provide fluorescent lamp over-voltage detection and protection circuits which are capable of detecting an over-voltage condition characteristic of one or more fluorescent lamps operating at failure mode or having reached the end of their operating life, and capable of shutting down the plurality of fluorescent lamps.

It is another object of the present invention to provide fluorescent lamp protection circuits which short out the high frequency electronic ballast upon detection of an overvoltage condition characteristic of one or more fluorescent lamps operating at failure mode or having reached the end of their operating life.

It is yet another object of the present invention to provide such detection and protection circuits using a simpler, more cost-effective, circuit than conventional protection circuits.

It is a still further goal of the present invention to provide detection and protection circuits that are easily scaleable, in that they allow for easy connection of additional fluorescent lamps to the detection and protection circuit.

The invention achieves these and other results by providing a detection circuit for detecting a difference between a highest and a lowest voltage of a plurality of fluorescent lamps connected to a ballast. Each fluorescent lamp has a first and second terminal, and the second terminals of the fluorescent lamp are connected together. The detection circuit includes a detecting bridge connected to the plurality of fluorescent lamps. The detecting bridge includes a plurality of pairs of nonlinear elements connected in series, the number of pairs being equal to the number of fluorescent lamps. The pairs of nonlinear elements are connected in parallel, the node between the nonlinear elements of each of the pairs being connected to the first terminal of a corresponding fluorescent lamp. A capacitor and a resistor are each connected in parallel across the pairs of nonlinear elements. The output of the detecting bridge, taken across said capacitor and the resistor, varies linearly with a difference between the highest and the lowest voltage detected across the fluorescent lamps.

According to another aspect of the invention, a detection circuit is provided for detecting the voltage of a fluorescent lamp operating at failure mode among a plurality of fluorescent lamps connected to a ballast. Each fluorescent lamp has a first and second terminal, the second terminal of each fluorescent lamp being connected to a common voltage. The detector includes a detecting bridge connected to the fluorescent lamps. The detecting bridge includes a plurality of pairs of nonlinear elements connected in series, the number of pairs being equal to the number of fluorescent lamps, plus one pair. The plurality of pairs of nonlinear elements are connected in parallel. The node between the nonlinear elements of all but one pair of nonlinear elements is connected to the first terminal of a corresponding fluorescent lamp, while the node between the nonlinear elements of the additional pair is connected to the common voltage. A capacitor and a resistive circuit are each connected in parallel across the pairs of nonlinear elements. The output of the detecting bridge, taken across the capacitor and the resistive circuit, varies linearly with a highest voltage across the plurality of fluorescent lamps, this highest voltage corresponding to the voltage of a fluorescent lamp operating at failure mode or at the end of its operating life.

According to a still further aspect of the invention, a protection circuit is provided for protecting a plurality of fluorescent lamps connected to a ballast. Each fluorescent lamp has a first and second terminal, the second terminal of each fluorescent lamp being connected to a common voltage. The protection circuit includes a detecting bridge connected to the fluorescent lamps, an output of which varies linearly with a highest voltage across the plurality of fluorescent lamps. A timer is connected to the output of the detecting bridge, and a trigger is connected to the output of the timer. The trigger is responsive to an over-voltage condition of a fluorescent lamp operating at failure mode. A controllable switch is connected across the fluorescent lamps, this controllable switch being controlled by an output signal of the trigger. The controllable switch, when closed, shorts the first terminal of each fluorescent lamp to the common voltage, thereby shorting out the ballast, and turning off all of the fluorescent lamps.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention may be clearly understood by reference to the attached drawings, wherein like elements are designated by like reference elements and in which.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
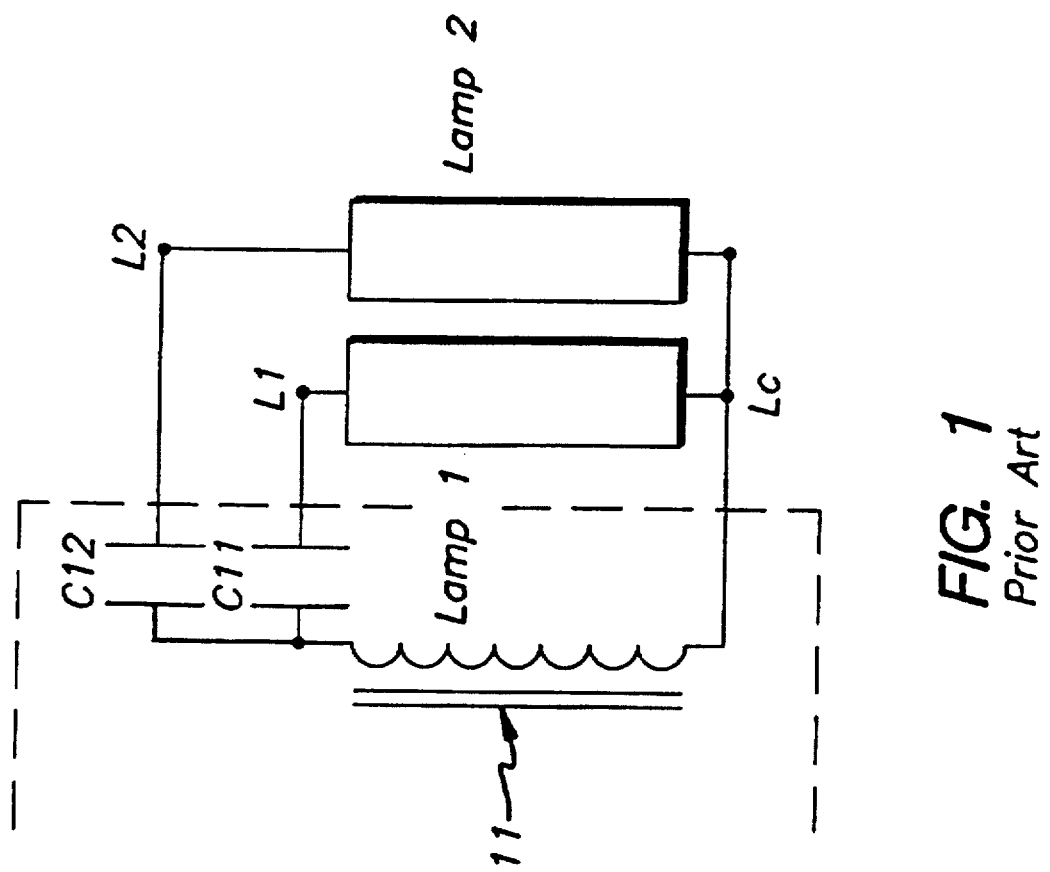
FIG. 1 is a circuit diagram of a conventional ballast circuit connected to a pair of fluorescent lamps.

FIG. 1 shows an example of a conventional circuit for supplying two fluorescent lamps to which the circuit according to the present invention may be applied. Reference numeral 11 refers to a high frequency electronic ballast output circuit. C11 and C12 are ballasting elements connected to terminal L1 of lamp 1 and terminal L2 of lamp 2, respectively. The other terminals Lc of lamp 1 and lamp 2 are each connected, via a common lead, to a common voltage at the ballast output circuit 11.

Figure 2:
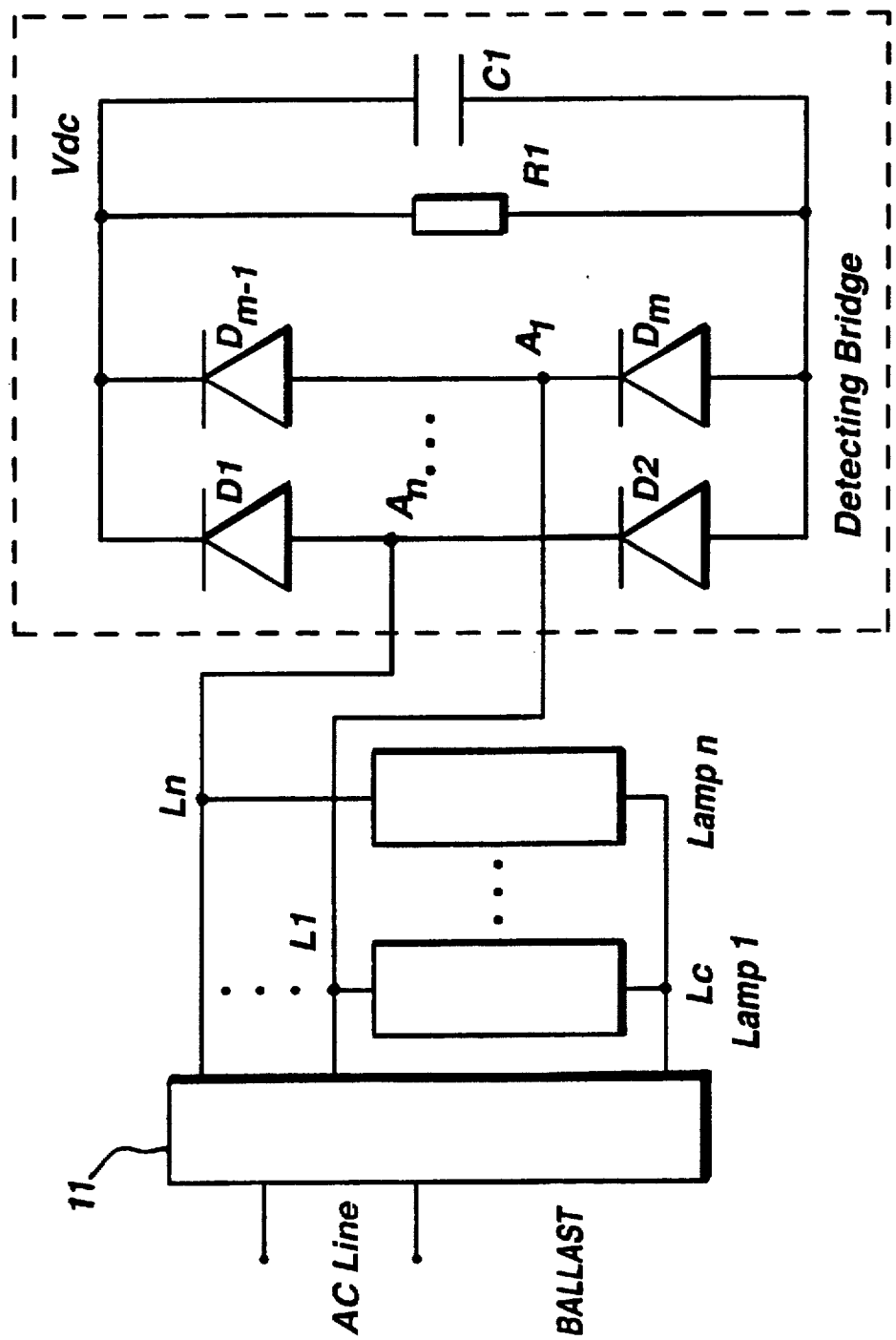
FIG. 2 is a circuit diagram of a detection bridge circuit for detecting a difference between the highest and the lowest voltage of a plurality of fluorescent lamps connected to a ballast according to a first embodiment of the present invention.

FIG. 2 shows a detecting bridge circuit connected to n fluorescent lamps according to a first embodiment of the present invention. Lamp 1 and lamp n are connected, at their respective first terminals L1 and Ln, to the ballast 11. The second terminals are connected to the ballast 11 via a common terminal Lc. The detecting bridge is composed of pairs of nonlinear elements connected in series, the pairs of nonlinear elements being connected to each other in parallel.

Nodes A1 and An between respective pairs of the nonlinear elements are connected to corresponding terminals L1 and Ln, respectively. The nonlinear elements of the detecting bridge are chosen such that they are conductive when forward biased with a voltage corresponding to a voltage generated by a fluorescent lamp operating at failure mode, or operating at the end of its operating life. In FIG. 2, the nonlinear elements are shown to be, for purposes of illustration, respective pairs of diodes D1, D2 and Dm-1, Dm. However, the skilled artisan will readily recognize that other elements exhibiting non-linear characteristics may be chosen, such as, for example, diode-connected transistors. A resistive circuit R1 is connected across the pairs of nonlinear elements. A capacitor C1 is also connected across the pairs of nonlinear elements, as well as across resistive circuit R1.

In operation, the detector circuit of FIG. 2 exhibits, at its output Vdc across capacitor C1, a dc voltage equal to the maximum relative voltage between the fluorescent lamps lamp 1 to lamp n. Indeed, if all fluorescent lamps lamp 1 to lamp n are operating normally, i.e., not at failure mode, the detecting bridge will be balanced, and the output at Vdc will be zero. When, however, n-1 lamps operate at the same voltage (for example, 100 volts), and one lamp operates at failure mode (for example, generating a voltage of 150 volts between its terminals), the output of the detection bridge will be the difference between the highest (150 volts) and lowest (100 volts) of the lamp voltages, or 50 volts. The output signal Vdc of the detecting bridge can be used as a logical control signal to alert a user that one or more fluorescent lamps are operating at failure mode, to trigger a circuit to turn off the fluorescent lamps, or to effectuate some other control function, as will be readily apparent to those having ordinary skill in the art.

Figure 3:
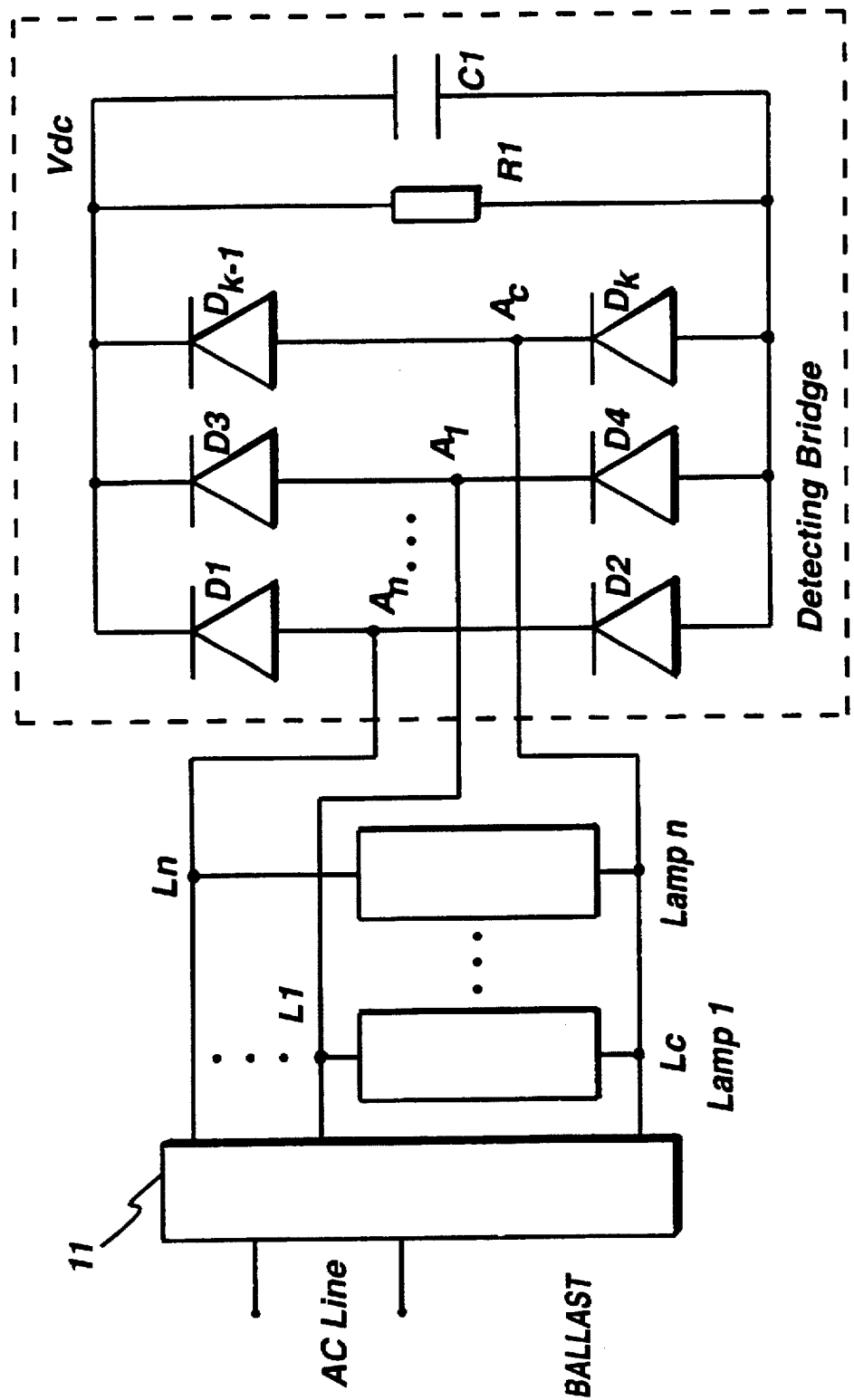
FIG. 3 is a circuit diagram of a bridge detection circuit for detecting the absolute voltage of n fluorescent lamps, and for detecting a voltage of a fluorescent lamp operating at failure mode among a plurality of fluorescent lamps connected to a high frequency ballast, according to a second embodiment of the present invention.

FIG. 3 shows a circuit diagram of a bridge detection circuit for detecting the absolute voltage of n fluorescent lamps, and for detecting a voltage of a fluorescent lamp operating at failure mode among a plurality of fluorescent lamps connected to a high frequency ballast, according to a second embodiment of the present invention. As in FIG. 2, lamp 1 and lamp n are connected, at their respective first terminals L1 and Ln, to the high frequency ballast 11. The second terminals are connected to the ballast 11 via a common terminal Lc. The detecting bridge is composed of pairs of nonlinear elements connected in series, the pairs of nonlinear elements being connected to each other in parallel. Nodes A1 and An between respective pairs of the nonlinear elements are connected to corresponding first terminals L1 and Ln, respectively. Unlike the embodiment depicted in FIG. 2, however, the node Lc is also connected to an additional pair of nonlinear elements, at node Ac. The nonlinear elements of the detecting bridge are chosen such that they are conductive when forward biased with a voltage corresponding to a voltage generated by a fluorescent lamp operating at failure mode, or operating at the end of its operating life. In FIG. 3, the nonlinear elements are shown to be, for purposes of illustration, respective pairs of diodes D1 and D2; D3 and D4; and Dk-1 and Dk. However, the skilled artisan will readily recognize that other elements exhibiting non-linear characteristics may be chosen, such as, for example, diode-connected transistors. A resistive circuit R1, as in the embodiment shown in FIG. 2, is connected across the pairs of nonlinear elements. A capacitor C1 is also connected across the pairs of nonlinear elements, as well as across resistive circuit R1.

In operation, the detector circuit of FIG. 3 exhibits, at its output Vdc across capacitor C1, a dc voltage equal to the maximum absolute voltage of the fluorescent lamps lamp 1 to lamp n. Indeed, if all fluorescent lamps lamp 1 to lamp n are operating normally, i.e., not at failure mode, the detecting bridge output voltage will be equal to the voltage of a normally operating fluorescent lamp, i.e., 100 volts. When, however, one lamp among the plurality of lamps lamp 1 to lamp n is operating at failure mode, or has reached the end of its operating life, the detection bridge output voltage will be , for example, 150 volts, corresponding to the maximum voltage detected which, in turn, corresponds to the over-voltage present across a fluorescent lamp operating at failure mode. The detecting bridge of FIG. 3, unlike the detecting bridge of FIG. 2, detects the maximum absolute voltage between the lamps, as the reference voltage is now the common voltage at Lc (or Ac), rather than Ln, as in the first embodiment. The output signal Vdc of the detecting bridge can, as in the first embodiment, be used as a logical control signal to alert a user that one or more fluorescent lamps is operating at failure mode, to trigger a circuit to turn off the fluorescent lamps, or to effectuate some other control function, as will be readily apparent to those having ordinary skill in the art.

Figure 4:
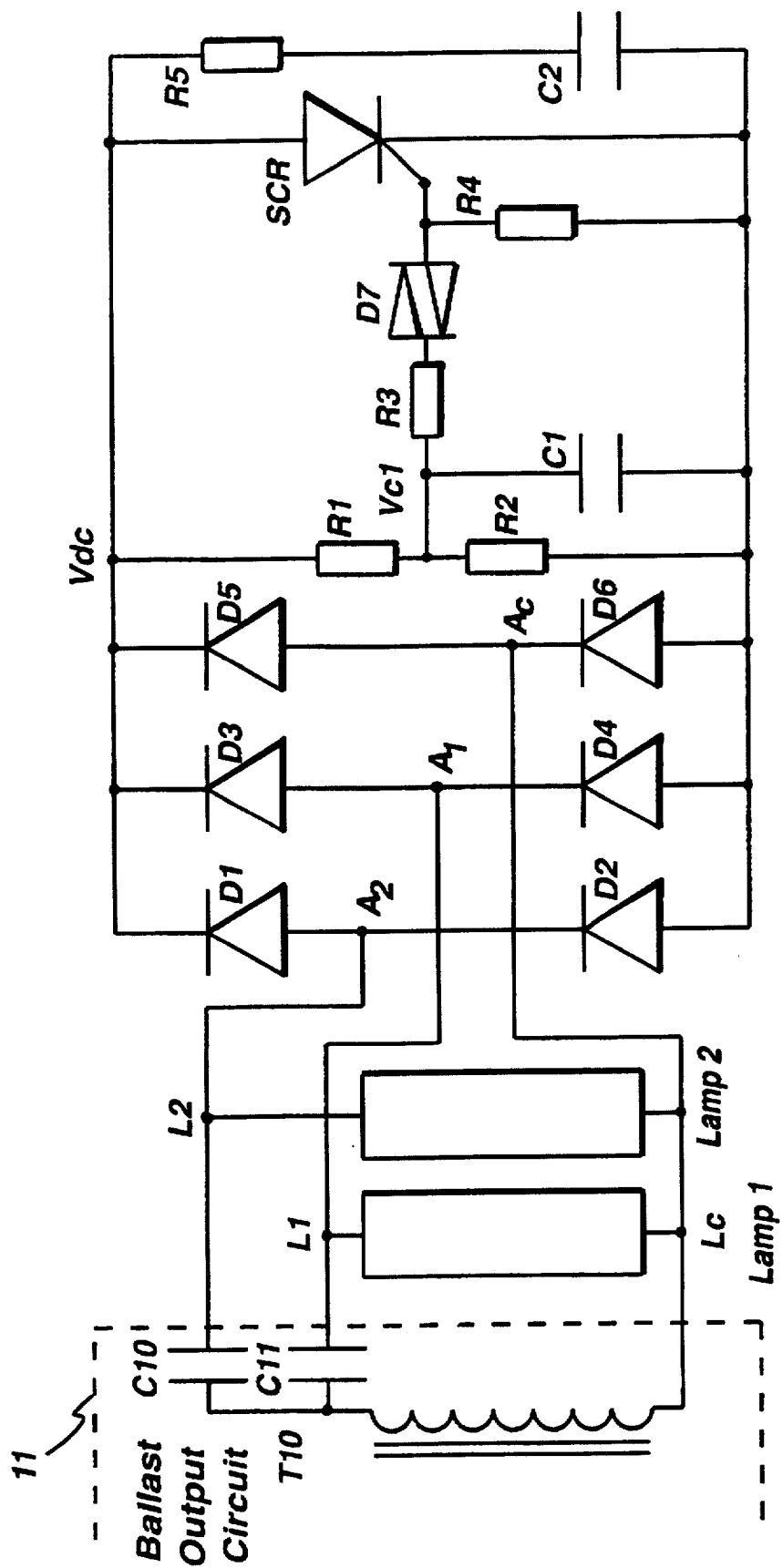
FIG. 4 is a circuit diagram of a protection circuit for detecting an over-voltage condition and for protecting a plurality of fluorescent lamps connected to a high frequency ballast, according to a third embodiment of the invention.

FIG. 4 shows a protection circuit, according to a third embodiment of the present invention, connected to a two lamp circuit of the type depicted in FIG. 1. Lamp 1 and lamp 2 are connected in parallel to the high frequency ballast 11 output circuit in parallel. C11 and C10 are ballasting elements connected to terminal L1 of lamp 1 and terminal L2 of lamp 2, respectively. The detecting bridge is composed of pairs of nonlinear elements connected in series, the pairs of nonlinear elements being connected to each other in parallel. Nodes A2 and A1 between respective pairs of the nonlinear elements are connected to corresponding first fluorescent lamp terminals L2 and L1, respectively. Node Ac between the remaining pair of nonlinear elements is connected to the common voltage at the node Lc. The nonlinear elements of the detecting bridge are chosen such that they are conductive when forward biased with a voltage corresponding to a voltage generated by a fluorescent lamp operating at failure mode, or operating at the end of its operating life. In FIG. 4, the nonlinear elements are shown to be, for purposes of illustration, respective pairs of diodes D1, D2; D3, D4; and D5, D6. However, the skilled artisan will readily recognize that other elements exhibiting non-linear characteristics may be chosen, such as, for example, diode-connected transistors.

A voltage divider circuit including, for example, a resistive circuit formed by resistors R1 and R2 is connected across the output of the detecting bridge. The voltage at the output of the detecting bridge is labeled as Vdc in FIG. 4. Since the output voltage Vdc at the output of the detecting bridge is linear to the maximum lamp voltage among the lamps, the output voltage Vdc can be used as a control signal indicative of the operation mode of the lamps.

The output voltage Vdc is then divided by the voltage divider of R1 and R2 to produce a voltage Vc1 across a timing capacitor C1 at the output of the voltage divider. The voltage Vc1 is, then:

$$Vc1 = Vdc \times R2/(R1+R2)$$

wherein Vdc is the output voltage;
R1 is the resistance value of resistor R1; and
R2 is the resistance value of resistor R2.

The timing capacitor C1 connected across Vc1, and the resistive circuit of R1 and R2, constitute a timer whose time constant Tc is chosen to be greater than an ignition time of fluorescent lamps not operating at failure mode, and is defined by:

$$Tc = C1 \times R1 \times R2/(R1+R2)$$

wherein C1 is the capacitance value of timing capacitor C1;
R1 is the resistance value of resistor R1; and
R2 is the resistance value of resistor R2.

The time constant Tc is, therefore, chosen such that the protection circuit according to the present invention is not triggered by the high voltages normally present during the ignition phase of fluorescent lamps.

A resistor R3 is connected between the output of the voltage divider and a trigger D7. Trigger D7 is used to trigger switch SCR, and may be, for example, a bi-directional diode such as a diac. The trigger D7 is responsive to an over-voltage condition of a fluorescent lamp operating at failure mode or at the end of its operating life. The switch SCR is, for example, a silicon-controlled-rectifier, and is connected across the output of the detecting bridge. A resistor R4 is connected between the output of the trigger D7 and the switch SCR. Finally, an output voltage smoothing and current limiting circuit is connected across the switch SCR to smooth the voltage across the detecting bridge and to limit the current through the switch SCR. In FIG. 4, the output voltage smoothing and current limiting circuit is illustrated as comprising a resistor R5 and a series capacitor C2, the series connected pair being connected across the output of the detecting bridge. However, any smoothing and attenuating filter may be employed, as those of skill in this art will readily recognize.

The following will detail the operation of the circuit illustrated in FIG. 4. During a normal operation of the fluorescent lamps, the voltage of the lamps is normal and the output voltage of the detecting bridge is the normal lamp voltage. The voltage of the capacitor C1, Vcl is lower than the trigger voltage of trigger D7. Switch SCR is in an off state and the whole system assumes a normal operating state.

If, for example, lamp 1 has failed, the voltage of lamp 1 goes high, and the detecting bridge detects the voltage of lamp 1. The output voltage Vdc goes high and charges timing capacitor C1. When the voltage of timing capacitor C1 is higher than the trigger voltage of trigger D7, D7 is triggered and switch SCR is turned on. When the switch SCR is turned on, the terminals L1 and L2 are shorted to the terminal Lc. This turns off both lamps lamp 1 and lamp 2, as their terminals have been shorted together. Thus, the circuit illustrated in FIG. 4 automatically shuts down the fluorescent lamps upon detection of an over-voltage condition characteristic of one or more fluorescent lamps operating at failure mode, or having reached the end of their operating life.

Figure 5:
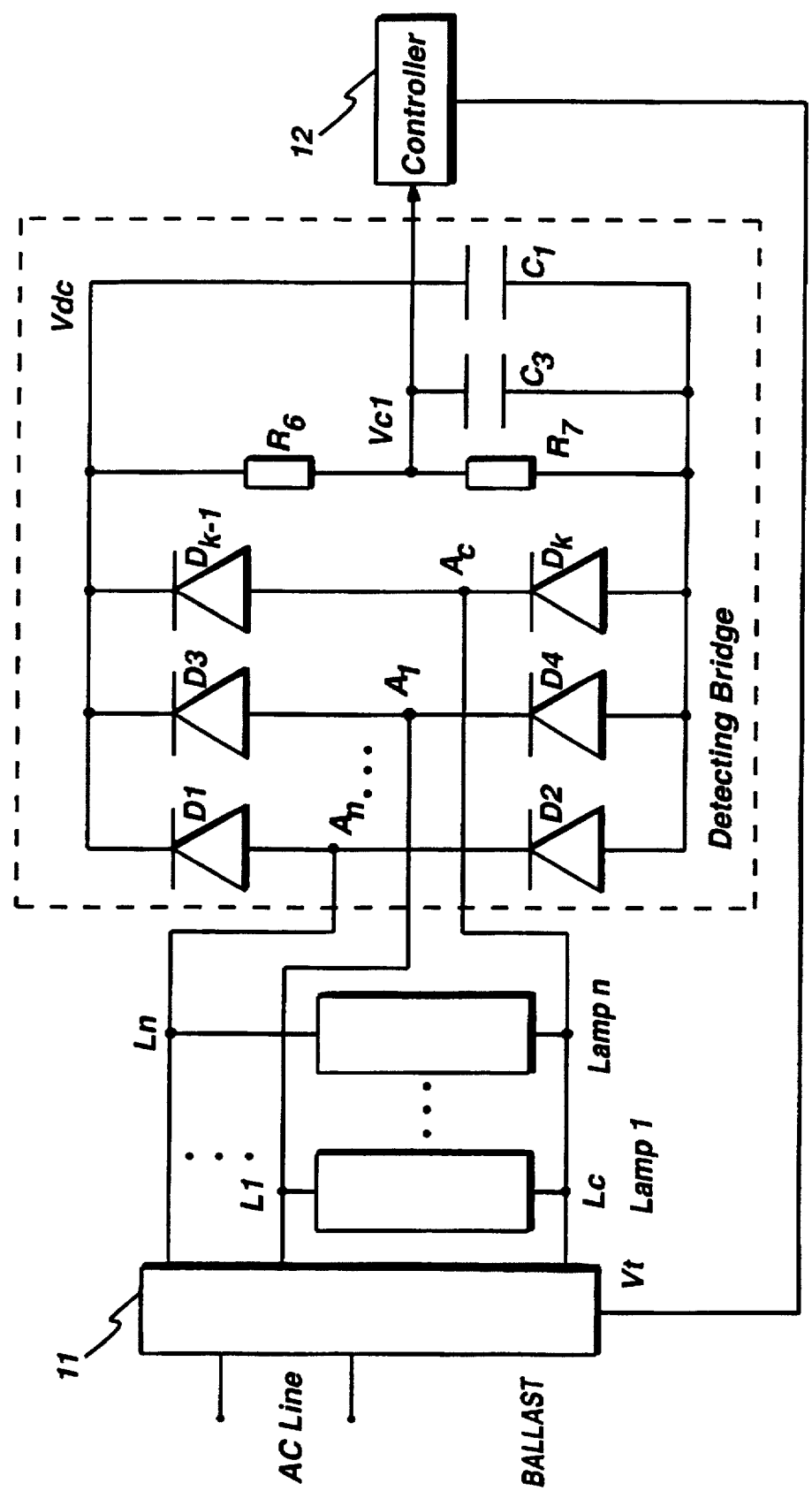
FIG. 5 is a circuit diagram of a protection circuit for detecting an over-voltage condition and for protecting and controlling a plurality of fluorescent lamps connected to a high frequency ballast according to a fourth embodiment of the present invention.

FIG. 5 is a circuit diagram of a protection circuit for detecting an over-voltage condition and for protecting and controlling a plurality of fluorescent lamps connected to a high frequency ballast, according to a fourth embodiment of the present invention. The embodiment shown in FIG. 5 is substantially similar to the embodiment shown in FIG. 3, and same reference characters are used to denote similar circuit elements. Indeed, lamp 1 and lamp n are connected, at their respective first terminals L1 and Ln, to the high frequency ballast 11. The second terminals are connected to the ballast 11 via a common terminal Lc. The detecting bridge is composed of pairs of nonlinear elements connected in series, the pairs of nonlinear elements being connected to each other in parallel. Nodes A1 and An between respective pairs of the nonlinear elements are connected to corresponding first terminals L1 and Ln, respectively. Node Lc is connected to an additional pair of nonlinear elements, at node Ac. The nonlinear elements of the detecting bridge are chosen such that they are conductive when forward biased with a voltage corresponding to a voltage generated by a fluorescent lamp operating at failure mode, or operating at the end of its operating life. In FIG. 5, the nonlinear elements are shown to be, for purposes of illustration, respective pairs of diodes D1, D2; D3, D4; and Dk-1, Dk. However, the skilled artisan will readily recognize that other elements exhibiting non-linear characteristics may be chosen, such as, for example, diode-connected transistors.

The resistive circuit of FIG. 5 is shown as two resistors forming a voltage divider, namely, R6 and R7, connected in series, the series combination being connected across the output of the detecting bridge. The output Vdc of the detecting bridge, therefore, is divided by the voltage divider of R6 and R7. The output voltage of the voltage divider is taken at node Vcl. A capacitor C1 is also connected across the pairs of nonlinear elements, as well as across resistors R6 and R7. An additional capacitor, C3, is connected in parallel across resistor R7. A controller 12 is connected to the voltage developed across capacitor C3, namely, to the voltage developed at Vcl. Since the output voltage of the detecting bridge, Vdc, is linear to the highest fluorescent lamp voltage, so is the voltage at Vcl. Vcl can, therefore, be used as an input signal to a controller, such as controller 12 shown in FIG. 5. The output of controller 12, Vt, is fed back and connected to the ballast 11. The controller 12 output signal Vt can, therefore, be used as a logical control signal to turn off the ballast 11, or as a linear control signal, such as a dimming control to dim the plurality of fluorescent lamps. Other uses for the controller 12 output signal Vt will no doubt occur to the skilled artisan. The exact structure of the controller 12 forms no part of the present invention. Various configurations will, of course, occur to those of ordinary skill, depending on the particular application at hand.

In operation, the detector circuit of FIG. 5 exhibits, at its output Vdc across capacitor C1, a DC voltage equal to the maximum absolute voltage of the fluorescent lamps lamp 1 to lamp n. Indeed, if all fluorescent lamps lamp 1 to lamp n are operating normally, i.e., not at failure mode, the detecting bridge output voltage will be equal to the voltage of a normally operating fluorescent lamp, i.e., for example, 100 volts. When, however, one lamp amongst the plurality of lamps lamp 1 to lamp n is operating at failure mode, or has reached the end of its useful life, the detection bridge output voltage will be , for example, 150 volts, corresponding to the maximum voltage detected which, in turn, corresponds to the over-voltage present across a fluorescent lamp operating at failure mode. The detecting bridge of FIG. 5 detects the maximum absolute voltage between the lamps, as the reference voltage is now the common voltage at Lc (or Ac), rather than Ln, as in the first embodiment. This maximum absolute voltage is divided by the voltage divider of R6 and R7, to produce the voltage at node Vcl. The controller 12 takes its input at Vcl, and generates a controller 12 output signal Vt.

The embodiments which have been described herein are but some of several which utilize this invention and are set forth here by way of illustration but not of limitation. It is apparent that many other embodiments which will be readily apparent to those skilled in the art may be made without departing materially from the spirit and scope of the invention.

What is claimed is:

1. A detection circuit for detecting a difference between a highest and a lowest voltage of a plurality of fluorescent lamps connected to a ballast, each fluorescent lamp of said plurality of fluorescent lamps having a first and second terminal, said second terminal of each fluorescent lamp being commonly connected, comprising:

a detecting bridge connected to said plurality of fluorescent lamps, said detecting bridge comprising:

a plurality of pairs of nonlinear elements connected in series, said plurality of pairs being equal in number to a number of said plurality of fluorescent lamps and being connected in parallel, a node between nonlinear elements of each pair of said plurality of pairs of nonlinear elements being connected to said first terminal of a corresponding fluorescent lamp; and a capacitor and a resistor, each connected in parallel across said plurality of pairs of nonlinear elements, an output of said detecting bridge, taken across said capacitor and said resistor, varying linearly with a difference between a highest and a lowest voltage detected across the plurality of fluorescent lamps.

2. Detection circuit according to claim 1, wherein each nonlinear element of said plurality of pairs of nonlinear elements is conductive when forward biased with a voltage corresponding to a voltage generated by a fluorescent lamp operating at failure mode or at the end of its operating life.

3. Detection circuit according to claim 1, wherein each nonlinear element of said plurality of pairs of nonlinear elements comprises a diode.

4. Detection circuit according to claim 1, wherein each nonlinear element of said plurality of pairs of nonlinear elements comprises a diode-connected transistor.

5. A detection circuit for detecting a voltage of a fluorescent lamp operating at failure mode among a plurality of fluorescent lamps connected to a ballast, each fluorescent lamp of said plurality of fluorescent lamps having a first and second terminal, said second terminal of each fluorescent lamp being connected to a common voltage, comprising:

a detecting bridge connected to said plurality of fluorescent lamps, said detecting bridge comprising:

a plurality of pairs of nonlinear elements connected in series, a number of said plurality of pairs of nonlinear elements being equal to a number of said plurality of fluorescent lamps plus one pair, said plurality of pairs of nonlinear elements being connected in parallel, a node between nonlinear elements of all but said one pair of said plurality of pairs of nonlinear elements being connected to said first terminal of a corresponding fluorescent lamp, a node between nonlinear elements of said one pair being connected to said common voltage; and a first capacitor and a resistive circuit, each connected in parallel across said plurality of pairs of nonlinear elements, an output of said detecting bridge, taken across said first capacitor and said resistive circuit, varying linearly with a highest voltage across said plurality of fluorescent lamps, said highest voltage corresponding to said voltage of said fluorescent lamp operating at failure mode or at the end of its operating life.

6. Detection circuit according to claim 5, wherein each nonlinear element of said plurality of pairs of nonlinear elements is conductive when forward biased with a voltage corresponding to a voltage generated by a fluorescent lamp operating at failure mode or at the end of its operating life.

7. Detection circuit according to claim 5, wherein each nonlinear element of said plurality of pairs of nonlinear elements comprises a diode.

8. Detection circuit according to claim 5, wherein each nonlinear element of said plurality of pairs of nonlinear elements comprises a diode-connected transistor.

9. A protection circuit for protecting a plurality of fluorescent lamps connected to a ballast, each fluorescent lamp of said plurality of fluorescent lamps having a first and second terminal, said second terminal of each fluorescent lamp being connected to a common voltage, comprising:

a detecting bridge connected to said plurality of fluorescent lamps, an output of said detecting bridge varying linearly with a highest voltage across said plurality of fluorescent lamps, said detecting bridge comprising a plurality of pairs of nonlinear elements connected in series, a number of said plurality of pairs of nonlinear elements being equal to a number of said plurality of fluorescent lamps plus one pair, said plurality of pairs of nonlinear elements being connected in parallel, a node between nonlinear elements of all but said one pair of said plurality of pairs of nonlinear elements being connected to said first terminal of a corresponding fluorescent lamp, a node between nonlinear elements of said one pair being connected to said common voltage;

a timer connected to said output of said detecting bridge;

a trigger connected to an output of said timer, said trigger being responsive to an over-voltage condition of a fluorescent lamp operating at failure mode; and a controllable switch connected across said plurality of fluorescent lamps, said controllable switch being controlled by an output of said trigger, said controllable switch, when closed, shorting said first terminal of each of said plurality of fluorescent lamps to said common voltage, thereby shorting said ballast, to turn off said plurality of fluorescent lamps.

10. Protection circuit according to claim 5, wherein said resistive circuit comprises a first and a second resistor connected in series, and wherein said protection circuit further comprises:

a second capacitor, connected in parallel across said second resistor; and a controller having an input connected to a node between said first and said second resistor and to said second capacitor, said controller having an output connected to said ballast, said output of s aid controller controlling an operation of said ballast.

11. Protection circuit according to claim 9, wherein each nonlinear element of said plurality of pairs of nonlinear elements is conductive when forward biased with a voltage corresponding to a voltage generated by a fluorescent lamp operating at failure mode or at the end of its operating life.

12. Protection circuit according to claim 9, wherein each nonlinear element of said plurality of pairs of nonlinear elements comprises a diode.

13. Protection circuit according to claim 9, wherein each nonlinear element of said plurality of pairs of nonlinear elements comprises a diode-connected transistor.

14. Protection circuit according to claim 9, wherein said timer comprises a voltage divider circuit connected across said output of said detecting bridge, an output of said voltage divider circuit being connected to a timing capacitor, said timer having a time constant greater than an ignition time of fluorescent lamps not operating at failure mode or at the end of its operating life.

15. Protection circuit according to claim 14, wherein said voltage divider circuit comprises a resistor circuit.

16. Protection circuit according to claim 9, wherein said trigger comprises a bi-directional diode which is conductive when said timing capacitor charges to a voltage exceeding a threshold voltage of said bi-directional diode.

17. Protection circuit according to claim 9, wherein said controllable switch is a silicon-controlled rectifier having a control electrode connected to said output of said trigger.

18. Protection circuit according to claim 9, further comprising an output voltage smoothing and current limiting circuit connected across said controllable switch, to thereby smooth the voltage across said detecting bridge and limit a current through said controllable switch.

19. Protection circuit according to claim 18, wherein said output voltage smoothing and current limiting circuit comprises an output resistor and an output capacitor connected in series.

* * * * *